Oct. 17, 1967

N. DOCK ET AL 3,347,024

WET SEPARATOR WITH VENTURI-SHAPED GAS CHANNELS

Filed Aug. 20, 1965

INVENTORS:
NILS DOCK
LENNART ERLESAND

BY Howson & Howson

ATTYS.

United States Patent Office 3,347,024
Patented Oct. 17, 1967

3,347,024
WET SEPARATOR WITH VENTURI-SHAPED GAS CHANNELS
Nils Dock, Saltsjo-Duvnas, and Lennart Erlesand, Huddinge, Sweden, assignors to Aktiebolaget Svenska Flaktfabriken, Stockholm, Sweden
Filed Aug. 20, 1965, Ser. No. 481,203
Claims priority, application Sweden, Sept. 8, 1964, 10,782/64
2 Claims. (Cl. 55—241)

The present invention relates to a new and improved construction of a wet separator adapted for cleaning dust-laden gases and more particularly to a wet separator comprising at least one Venturi-shaped gas channel of rectangular cross-section supplied with a liquid, which in the narrowest portion of the gas channel is admixed in atomized state with the gas.

In wet separators of the aforementioned type the more efficient gas cleaning depends on the amount of gas flow. Thus, for obtaining maximum effect a substantially constant gas amount is required for a particular designed and dimensioned system. In practice, it is practically impossible to achieve a constant volume gas flow. The scrubbing effect therefore varies according to the varying gas amount and this results in incomplete cleaning of the gas from time to time. The invention has as its principal object to eliminate said drawback and to ensure a maximum cleaning effect. The invention is characterized in that valve blades are pivotally mounted at the outlet ends of each of the gas channels along two opposite lateral edges and provided with individually actuated adjusting members, by which members the valve blades can be swung more or less inwardly towards the central plane of the gas channel, thus rendering it possible to adjust the flow area by steps or continuously to thereby obtain a second Venturi effect in the outlet portion formed by the valve blades.

Figure 1:
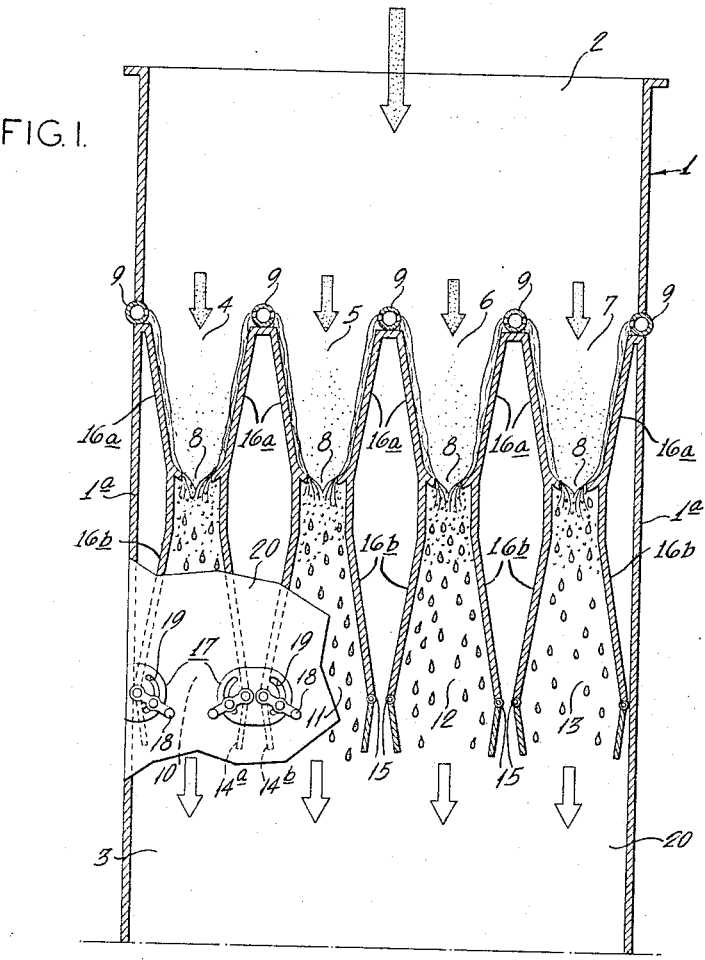
Figure 2:
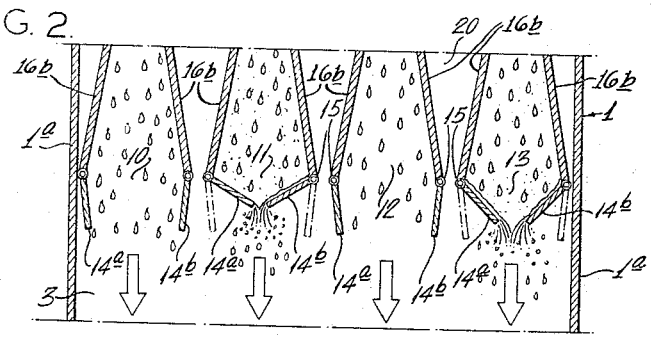

Other objects and a fuller understanding of the invention may be had by referring to the following specification and claims taken in conjunction with the accompanying drawing in which:

FIG. 1 is a fragmentary sectional view of a wet separator constructed in accordance with the invention; and FIG. 2 is a fragmentary sectional view of a portion of the device shown in FIG. 1 and with certain apparatus shown in another position.

Referring now to the drawing, a wet separator 1 for cleaning dust-laden gases and having a casing 1a illustrated therein. The wet separator is provided with an inlet 2 for permitting entrance therein of dust-laden gases, as illustrated by the dotted arrow, and an outlet 3 for permitting egress of clean gases as shown by the arrows. In the embodiment shown the wet separator comprises at least one, in the present instance a plurality of longitudinally extending Venturi-shaped gas channels 4, 5, 6 and 7 connected in parallel across the entire casing 1a. As illustrated the channels are supplied with a liquid through liquid supply means, in the present instance tubes 9, either at the inlet of each gas channel for effecting a liquid film down to the narrowest portion or throat 8 of the gas channel or the liquid may be introduced in known manner radially into the throat 8. As shown in FIG. 1, each of the Venturi-shaped gas channels has longitudinally extending upper converging and lower diverging side walls 16a and 16b respectively. 14a and 14b designate valve blades depending from the side walls 16b at the outlet ends 10, 11, 12 and 13 of each of the gas channels. The valve blades are provided with pivots 15 along two opposite lateral, terminal edges and are also provided with, in the present instance, individually actuated adjusting means or members 17, which in the present instance each comprises a handle 18 connected to the pivot 15 for rotation in an arcuate slot 19 in one end wall 20 of the casing 1a. By means of the maneuvering means the valve blades may be swung in pairs more or less inwardly towards the central plane of the gas channels 4, 5, 6 and 7, thereby rendering it possible to adjust the flow area of the wet separator 1 to the gas flow in question and to obtain a second Venturi or throttling effect in the outlet portions 10, 11, 12 and 13 formed by the valve blades. Such a setup of the valve blades is illustrated in FIG. 2 wherein the valve blades 14a and 14b associated with outlet portions 11 and 13 are turned inwardly to provide a second throat.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A wet separator for cleaning dust-laden gases comprising a casing defining a gas flow path having an inlet for entry of dust-laden gases and an outlet for removal of clean gas; at least one longitudinally extending Venturi-shaped gas channel having converging and diverging side walls positioned respectively between said inlet and said outlet, and a throat in said channel; means connecting said converging side walls to said casing adapted to cause said dust-laden gases to pass into said converging side walls of said channel; liquid supply means for effecting a liquid film at said throat in said channel; longitudinally extending valve blades pivotably connected to and depending from the terminus of said diverging side walls; and adjusting means connected to said blades to pivot said blades to adjust the flow area whereby a second Venturi effect may be provided at the outlet portion of said channel formed by said valve blades.

2. A wet separator for cleaning dust-laden gases in accordance with claim 1 including a plurality of Venturi-shaped gas channels as defined in claim 1 positioned transversely between the side walls of said casing and extending longitudinally thereof whereby all of the impurity-laden gas must pass through said channels in order to reach said outlet.

References Cited

UNITED STATES PATENTS

| 536,415 | 3/1895 | Bogert | 230—112 |
|---|---|---|---|
| 1,051,872 | 2/1913 | Eirich | 251—212 |
| 1,087,970 | 2/1914 | Murray | 261—112 |
| 1,557,399 | 10/1925 | Bancel | 261 |
| 3,113,168 | 12/1963 | Kinney | 261—113 |
| 3,138,647 | 6/1964 | Krantz | 55—241 |

FOREIGN PATENTS 143,371  5/1962  Russia.

HARRY B. THORNTON, *Primary Examiner.*
B. NOZICK, *Assistant Examiner.*